Patented June 29, 1954

2,682,543

UNITED STATES PATENT OFFICE 2,682,543

CATALYTIC REDUCTION OF DIPHENYL ALKANOLAMINES AND RESULTING PRODUCTS

Donald Wallace Adamson and Samuel Wilkinson, London, England, assignors to Burroughs Wellcome & Co. (U. S. A.) Inc., Tuckahoe, N. Y., a corporation of New York No Drawing. Application May 26, 1951, Serial No. 228,528

13 Claims. (Cl. 260—294.7)

The present invention relates to a novel method for the partial catalytic reduction of diphenyl alkanolamines and to certain derivatives partially reduced by this procedure having valuable therapeutic properties.

It is known that when compounds containing two closely joined benzene rings are reduced catalytically, the hydrogenation proceeds smoothly with no change in rate corresponding to a difference in the ease of reduction of the two rings. Nevertheless, it has been found that when compounds of the type:

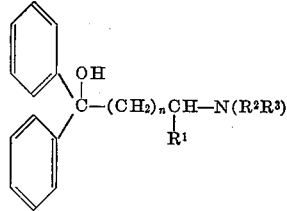

I are reduced it is possible by stopping the reaction at an intermediate stage to isolate the half-reduced compound:

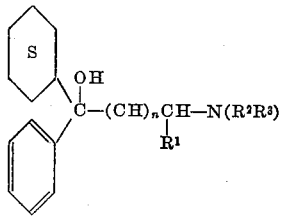

II in pure form and in useful yield.

The rate of absorption of hydrogen (that is to say the speed of the reaction) is found to be dependent upon a number of factors. The reaction proceeds at different rates in different solvents, for example, is faster in glacial acetic acid than in aqueous acetic acid or ethanol, and the hydrochloric acid salt of compound I is found to be hydrogenated faster than the free base. Furthermore, an increase in the amount of catalyst used results in a higher rate of reaction.

It has been found that, if due consideration is given to the above factors, it is possible to choose conditions such that the rate of reaction can be controlled and stopped at any point. By stopping after substantially 3 mols of hydrogen have reacted and preferably slightly more, say 3½ mols to ensure complete removal of the starting compound, the hexahydro derivative (II) so produced may be isolated and purified, for example, by crystallization from a solvent in which it is sparingly soluble, such as light petroleum, and in which the completely reduced substance is considerably more soluble.

This reaction has been extended and found to be effective for the preparation of a number of homologues and analogues, defined by the general formula (II), in which $R^1$ is hydrogen or an alkyl group containing from one to three carbon atoms and $R^2$ and $R^3$ are identical or different and are methyl or ethyl groups or —$NR^2R^3$ is a morpholino-, pyrrolidino- or piperidino-group and $n$ is an integer from one to five inclusive.

Some of the products of the present invention are already known although previous methods of synthesis are less advantageous. Among these is the product of Examples 9 to 12 inclusive which is marketed under the name of Artane. Others are new compounds and some have already been ascertained to possess valuable physiological properties, especially as spasmolytic agents and in the treatment of Parkinson's disease. Notable in this respect is 3-pyrrolidino-1-cyclohexyl-1-phenyl propan-1-ol.

For physiological purposes these substances are conveniently administered as salts, the identity of the acid being of little importance provided it is non-toxic. The salts are therefore considered to be equivalents to the bases.

EXAMPLE 1

*3-dimethylamino-1-cyclohexyl-1-phenyl-propan-1-ol*

3 - dimethylamino - 1:1 - diphenylpropan - 1-ol (3 g.) was dissolved in ethanol (100 ml.) and hydrogenated in the presence of platinum oxide (0.5 g.). When hydrogen, somewhat in excess of that required for the reduction of one phenyl residue, had been absorbed, the catalyst was filtered off and the filtrate evaporated to dryness. The residue was crystallized from light petroleum (B. P. 40–60°) to give 3-dimethylamino-1-cyclohexyl-1-phenylpropan-1-ol, M. P. 44–45° C. Hydrochloride, M. P. 213–214° C., with decomposition.

EXAMPLE 2

*3-piperidino-1-cyclohexyl-1-phenylbutan-1-ol*

3-piperidino-1:1-diphenylbutan-1-ol (6.32 g.) was hydrogenated in glacial acetic acid (50 ml.) in the presence of platinum oxide (0.68 g.) until hydrogen, somewhat in excess of that required for the reduction of one phenyl residue had been absorbed. The catalyst was filtered off and the filtrate diluted with water and basified. The precipitated resin was extracted with ether, the ethereal solution dried over anhydrous sodium sulphate and evaporated. The residue was converted into its hydrochloric acid salt in the usual manner and crystallized from a mixture of ethanol and ether to give 3-piperidino-1-cyclohexyl-1-phenylbutan-1-ol hydrochloride, M. P. 244–245° C. (5.9 g.).

The compounds listed below were also prepared by similar methods to those described in the two examples described in full.

EXAMPLE 3

3 - diethylamino - 1 - cyclohexyl - 1 - phenylpropan-1-ol (melting point 50.5–52° C., hydrochloride melts at 184–185° C.).

EXAMPLE 4

3 - pyrrolidino - 1 - cyclohexyl - 1 - phenylpropan-1-ol, M. P. 85.5–86.5° C. (hydrochloride melts at 226–227° decomp.).

EXAMPLE 5

3 - morpholino - 1 - cyclohexyl - 1 - phenylpropan - 1 - ol (melting point 114–116° C., hydrochloride melts at 271–272° C.).

EXAMPLE 6

3 - dimethylamino - 1 - cyclohexyl - 1 - phenylbutan - 1 - ol (hydrochloride melts at 198° C.).

EXAMPLE 7

3 - dimethylamino - 1 - cyclohexyl - 1 - phenylhexan - 1 - ol (hydrochloride melts at 243–244° C.).

EXAMPLE 8

3-piperidino - 1 - cyclohexyl - 1 - phenylhexan-1-ol (hydrochloride melts at 258–259° C.).

EXAMPLE 9

3 - piperidino - 1:1 - diphenylpropan - 1 - ol 5 g. (0.017 mole) was dissolved in glacial acetic acid (50 ml.) to which platinum oxide (Adams' catalyst) (1.3 g.) was added and shaken in an atmosphere of hydrogen. After the adsorption of hydrogen equal to 3.4 mols of hydrogen per mol of compound, the catalyst was filtered off and the filtrate diluted with water (150 ml.). The solution was made strongly alkaline with concentrated aqueous caustic potash, while cooling in an ice-bath, and extracted with ether. The ethereal extract was washed with water, dried over anhydrous sodium sulphate and concentrated. The residue (4.96 g.) was crystallized twice from light petroleum (B. P. 80–100° C.) to give 3-piperidino - 1 - cyclohexyl - 1 - phenylpropan - 1 - ol, melting point 112° C. (4.3 g.).

EXAMPLE 10

3 - piperidino - 1:1 - diphenylpropan - 1 - ol 5 g. (0.017 mole) was dissolved in glacial acetic acid (5 ml.) to which was added water (50 ml.) and platinum oxide (Adams' catalyst) (0.9 g.) and shaken in an atmosphere of hydrogen. After the adsorption of hydrogen equal to 3.3 mols of hydrogen per mol of compound, the reaction product was worked up as described in the previous example, when 3-piperidino-1-cyclohexyl-1-phenyl-propan-1-ol (4 g.), was isolated.

EXAMPLE 11

3 - piperidino - 1:1 - diphenylpropan - 1 - ol (10 g.) was suspended in ethanol (125 ml.) to which concentrated hydrochloric acid (3.4 ml.) and Adams' catalyst (2.4 g.) were added. The mixture was hydrogenated at an initial pressure of hydrogen of 29 atmospheres. When the hydrogen absorbed had reached an equivalent of 3½ mols the catalyst was filtered from the solution and the filtrate evaporated to dryness in vacuo. The residue was dissolved in water and the solution basified. On working up as previously described, 3-piperidino-1-cyclohexyl-1-phenylpropan-1-ol (8.3 g.) was obtained.

EXAMPLE 12

3 - piperidino - 1:1 - diphenylpropan - 1 - ol (50 g.) was dissolved in glacial acetic acid (250 ml.) and hydrogenated in the presence of Adams' catalyst (3.45 g.) under an initial pressure of 67 atmospheres of hydrogen. After the absorption of 3½ moles of hydrogen, the product isolated as previously described to give 3-piperidino-1-cyclohexyl-1-phenylpropan-1-ol (42 g.) (recrystallized from light petroleum).

EXAMPLE 13

5 - diethylamino - 1 - phenyl - 1 - cyclohexylpentan-1-ol (hydrogen oxalate melts at 156–157° C.) was prepared by the method of Example 12.

EXAMPLE 14

6 - pyrrolidino - 1 - phenyl - 1 - cyclohexylhexan - 1 - ol (melting point 98° C., hydrochloride melts at 128° C.) was prepared by the method of claim 12.

The compounds of the present invention may be presented pharmaceutically as salts of acids which are not toxic at the dose levels at which the compounds are used.

We claim:

1. A method of preparing a compound of the formula:

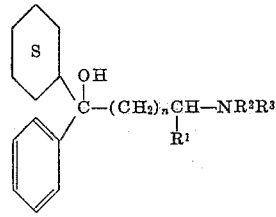

wherein $R^1$ is a radical selected from the class consisting of hydrogen and the alkyl groups containing from 1 to 3 carbon atoms, $R^2$ and $R^3$ are radicals selected from the class consisting of methyl and ethyl, $-NR^2R^3$ is a radical selected from the class consisting of morpholino, pyrrolidino and piperidino and $n$ is an integer from 1 to 5 inclusive, which consists in treating the corresponding diphenyl derivative under acid conditions in the presence of hydrogen and a catalyst until around 3 to 3½ mols of hydrogen have been absorbed.

2. The method described in claim 1 in which the product is separated by crystallization from a non-polar solvent.

3. The method described in claim 1 wherein hydrogenation of the diphenyl derivative takes place in glacial acetic acid solution.

4. The procedure described in claim 1 wherein a salt of the diphenyl derivative is reduced in glacial acetic acid solution.

5. The procedure described in claim 1 wherein the hydrochloride of the derivative is reduced in glacial acetic acid solution.

6. The method of claim 1, wherein the procedure continued until approximately 3½ mols of hydrogen have been absorbed.

7. A method of preparing the compound

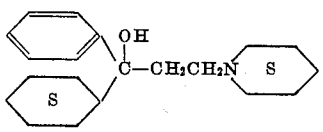

which consists of treating 1,1-diphenyl-3-piperidino-propan-1-ol in the presence of hydrogen and a catalyst until around 3 to 3½ mols of hydrogen have been absorbed.

8. The method of claim 7 wherein the procedure is continued until approximately 3½ mols of hydrogen have been absorbed.

9. The method of claim 7 wherein the procedure is continued until about 3½ mols of hydrogen are absorbed and the product is recovered by crystallization from a non-polar solvent.

10. The procedure set forth in claim 7 wherein about 3½ mols of hydrogen are absorbed and the product is recovered by crystallization from petroleum ether.

11. The procedure set forth in claim 7 wherein hydrogenation is carried out while the product is dissolved in glacial acetic acid.

12. The procedure set forth in claim 7 wherein a salt of the derivative is reduced in glacial acetic acid solution by absorption of 3½ mols of hydrogen.

13. A method of preparing the compound

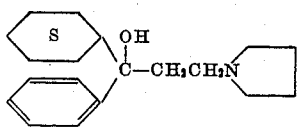

which consists of reducing 1,1-diphenyl-3-pyrrolidino-propan-1-ol in the presence of hydrogen and a catalyst until around 3 to 3½ moles of hydrogen have been absorbed.

References Cited in the file of this patent

UNITED STATES PATENTS

| Number | Name | Date |
|---|---|---|
| 2,132,389 | Bertsch | Oct. 11, 1938 |
| 2,494,563 | Kirk | Jan. 17, 1950 |
| 2,511,028 | Whitman | June 13, 1950 |

FOREIGN PATENTS

| Number | Country | Date |
|---|---|---|
| 619,706 | Great Britain | Mar. 14, 1949 |
| 624,117 | Great Britain | May 27, 1949 |
| 624,118 | Great Britain | May 27, 1949 |
| 627,139 | Great Britain | July 29, 1949 |